(12) United States Patent
Byrne et al.

(10) Patent No.: US 10,965,049 B2
(45) Date of Patent: Mar. 30, 2021

(54) PCB-MOUNTED HIGH VOLTAGE ELECTRICAL OUTLET

(71) Applicants: Norman R. Byrne, Ada, MI (US); Joseph D. Ward, Grand Rapids, MI (US); Aaron G. Lautenbach, Rockford, MI (US)

(72) Inventors: Norman R. Byrne, Ada, MI (US); Joseph D. Ward, Grand Rapids, MI (US); Aaron G. Lautenbach, Rockford, MI (US)

( * ) Notice: Subject to any disclaimer, the term of this patent is extended or adjusted under 35 U.S.C. 154(b) by 0 days.

(21) Appl. No.: 16/403,922

(22) Filed: May 6, 2019

(65) Prior Publication Data
US 2019/0341712 A1 Nov. 7, 2019

Related U.S. Application Data

(60) Provisional application No. 62/667,091, filed on May 4, 2018.

(51) Int. Cl.
*H01R 13/04* (2006.01)
*H01R 24/78* (2011.01)
*H01R 13/73* (2006.01)

(52) U.S. Cl.
CPC ............ *H01R 13/04* (2013.01); *H01R 13/73* (2013.01); *H01R 24/78* (2013.01)

(58) Field of Classification Search
CPC ........... H04B 1/38; H04M 1/62; H01R 24/78; H01R 13/04; H01R 13/02; H01R 24/00; H01R 33/00
See application file for complete search history.

(56) References Cited

U.S. PATENT DOCUMENTS

| 5,556,308 | A | 9/1996 | Brown et al. | |
| 8,758,031 | B2* | 6/2014 | Cheng | H05K 5/02 |
| | | | | 439/107 |
| 9,312,673 | B2* | 4/2016 | Byrne | H02G 3/185 |
| 10,008,816 | B2* | 6/2018 | Byrne | H01R 27/02 |
| 10,673,191 | B2* | 6/2020 | Byrne | H02J 50/12 |
| 2002/0154528 | A1* | 10/2002 | Ravid | H01R 31/065 |
| | | | | 363/146 |
| 2013/0280956 | A1* | 10/2013 | Cheng | H02G 3/14 |
| | | | | 439/620.15 |
| 2016/0141973 | A1 | 5/2016 | Abdalla et al. | |

(Continued)

*Primary Examiner* — Abdullah A Riyami
*Assistant Examiner* — Nader J Alhawamdeh
(74) *Attorney, Agent, or Firm* — Gardner, Linn, Burkhart & Ondersma LLP

(57) ABSTRACT

An electrical receptacle assembly includes an electrically insulative board, such as a silicon-based printed circuit board (PCB), with electrical contacts mounted to the board to form a high voltage AC receptacle configured to receive a male plug associated with an electrical consumer. The electrical contacts may be mechanically connected directly to the board and receive electrical power from respective wires fitted with terminal connectors, or may be supported in receptacle assemblies that receive electrical power from conductors embedded in the board. Optionally, the electrical contacts are mounted directly to a separate receptacle board that extends outwardly from a main board. A low voltage receptacle and associated circuitry may be incorporated into the receptacle assembly, which may further include an outer housing to facilitate mounting in a work area or the like.

16 Claims, 9 Drawing Sheets

(56) References Cited

U.S. PATENT DOCUMENTS

| | | | |
|---|---|---|---|
| 2017/0317458 A1* | 11/2017 | Byrne | H01R 27/02 |
| 2017/0317533 A1* | 11/2017 | Byrne | H02J 7/0042 |
| 2017/0318609 A1* | 11/2017 | Byrne | H01R 27/02 |
| 2018/0358765 A1* | 12/2018 | Byrne | H02J 7/00 |
| 2019/0341712 A1* | 11/2019 | Byrne | H01R 13/73 |

* cited by examiner

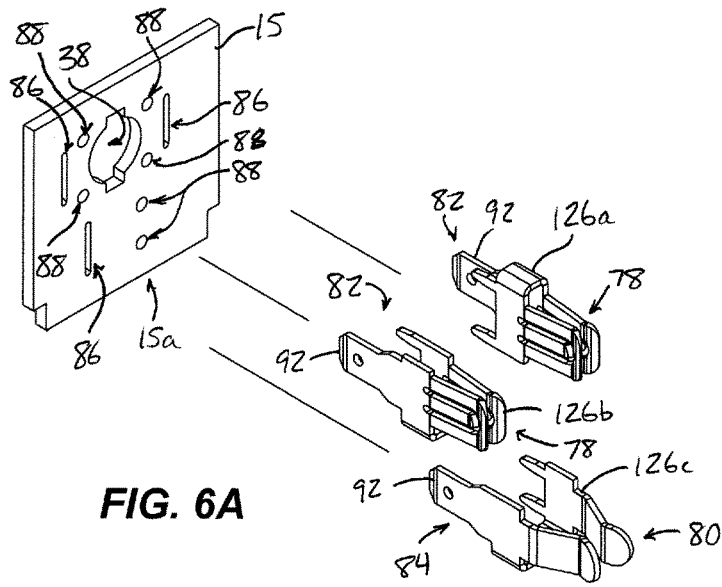
FIG. 6A
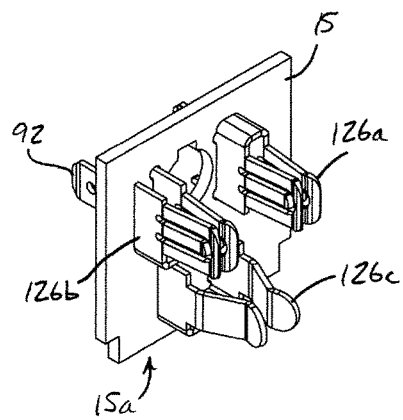
FIG. 6B
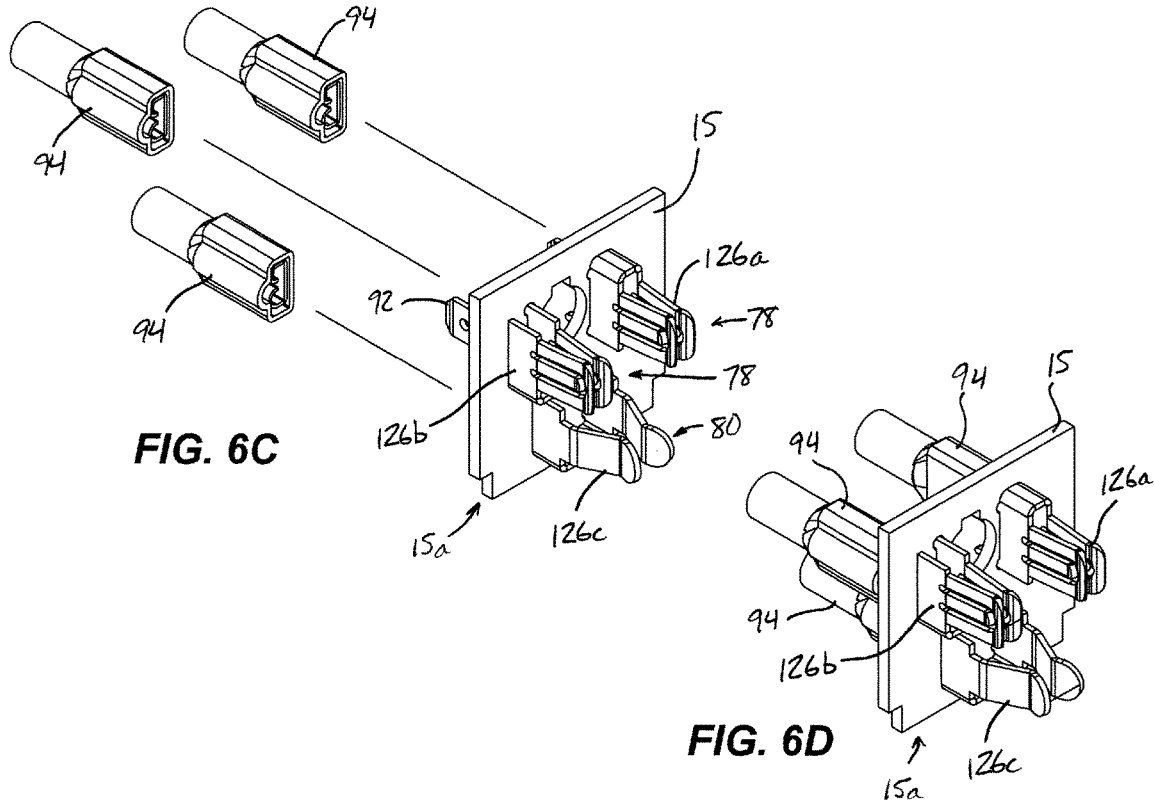
FIG. 6C
FIG. 6D

PCB-MOUNTED HIGH VOLTAGE ELECTRICAL OUTLET

CROSS REFERENCE TO RELATED APPLICATION

The present application claims the benefit of U.S. provisional application, Ser. No. 62/667,091, filed May 4, 2018, which is hereby incorporated herein by reference in its entirety.

FIELD OF THE INVENTION

The present invention relates to electrical power distribution systems for use in work areas and the like.

BACKGROUND OF THE INVENTION

The need or desire to incorporate electrical power outlets in different locations has increased as portable electronic devices such as mobile phones, portable media players, laptop computers, and the like have proliferated, since these devices often require charging of onboard batteries. Such devices or their charging cords often require access to high voltage (e.g., 110V AC or 220V AC) power outlets, which are typically assembled into bulky housings using techniques and hardware such as butt splices for lengths of wire or other conductors, and numerous threaded fasteners.

SUMMARY OF THE INVENTION

The present invention provides an electrical power unit or receptacle assembly that includes at least one high voltage AC (e.g. 110V or 220V) electrical outlet mounted to a printed circuit board (PCB) that carries the electrical power to the outlet via at least two electrical conductors. The high voltage AC electrical receptacle is at least mechanically coupled to the PCCB (and in some cases also electrically coupled to the PCB), and has at least two electrical contacts for receiving respective prongs of a male plug. The electrical contacts cooperate to define an insertion axis for the male plug, and the insertion axis is substantially parallel to the PCB.

In one form of the present invention, an electrical receptacle assembly includes a printed circuit board (PCB), at least two electrical conductors, and a high voltage AC electrical receptacle. The electrical conductors are disposed along a generally planar portion of the PCB and each is configured to conduct high voltage AC electrical current to respective contacts in the AC electrical receptacle. The high voltage AC electrical receptacle is coupled to the PCB and includes at least two outlet openings positioned in front of the electrical contacts such that the outlet openings and the electrical contacts cooperate to define an insertion axis that is substantially parallel to the planar portion of the PCB.

According to one aspect, there are at least two electrical input terminals extending outwardly from the PCB. The electrical input terminals are configured to be engaged by respective terminals of an electrical power source, and the at least two electrical input terminals are in electrical communication with the electrical conductors via conductor traces disposed along the PCB.

According to another aspect, a second high voltage AC electrical receptacle is coupled to the generally planar portion of the PCB, and there are at least two high voltage electrical conductor traces disposed along the PCB to provide electrical continuity from the at least two electrical input terminals of the high voltage AC electrical receptacle to respective electrical input terminals of the second high voltage AC electrical receptacle.

According to yet another aspect, a low voltage DC electrical receptacle is coupled to the generally planar portion of the PCB adjacent the high voltage AC electrical receptacle. Optionally, electrical converter circuitry is coupled to the housing and configured to convert incoming high voltage AC electrical power from the power supply conductors to low voltage DC electrical power, which is is directed along the main PCB to the low voltage DC electrical receptacle.

In another form of the present invention, an electrical receptacle assembly includes a housing defining an interior cavity, a main printed circuit board (PCB) in the interior cavity, a receptacle board coupled to the PCB, at least two high voltage AC electrical power contacts coupled directly to the receptacle board, at least two high voltage AC electrical power supply conductors extending through the housing and into the interior cavity, and at least two high voltage AC electrical input contacts in electrical communication with the electrical power contacts and the power supply conductors. The housing defines at least two receptacle openings providing access to the interior cavity, in addition to an opening for the power supply conductors. The receptacle board extends outwardly away from the main PCB and defines a plurality of contact openings in spaced arrangement, with the high voltage AC electrical power contacts coupled to the receptacle board at the contact openings. The electrical power contacts are positioned behind the receptacle openings in the housing and are configured to receive respective prongs of a male power plug inserted through the receptacle openings.

According to one aspect, the electrical power contacts each include a rearward-projecting pin for engagement with a respective one of the contact openings. Optionally, solder joints are used to couple each of the rearward-projecting pins to the receptacle board at the contact openings.

According to another aspect, the receptacle board defines a plurality of slots spaced apart from the openings, and the electrical power contacts each include a rearward-projecting male spade that is inserted through a respective slot during assembly. The rearward-projecting male spades project rearwardly from a rear surface of the receptacle board. Optionally, a female blade terminal is electrically coupled to each of the male spades, and provides electrical continuity to the power supply conductors.

In yet another form of the present invention, an electrical receptacle assembly includes a generally planar insulative receptacle board and at least two high voltage AC electrical power contacts that are individually secured directly to the receptacle board. The receptacle board defines a plurality of slots in spaced arrangement and a plurality of openings in spaced arrangement with respective slots. Each of the power contacts has a rear mounting portion and a flexible forward contact portion, with the rear mounting portion is coupled directly to the receptacle board at respective sets of the slots and openings. The rear mounting portions each include a rearward-projecting pin that is received and secured at a respective opening in the receptacle board, with a rearward-projecting power-receiving terminal that is spaced from the rearward-projecting pin. The power-receiving terminal is received through a respective one of the slots so that it projects rearwardly from the receptacle board for electrical coupling to a power supply conductor. The flexible forward contact portion extends forwardly from the receptacle board and is configured to receive a prong of a male power plug.

Thus, the electrical receptacle assemblies of the present invention provide high voltage AC electrical power outlets that are mounted to a PCB or similar panel or board, which may include electrical traces and/or support for circuitry such as an AC to DC electrical power converter. The receptacles may be set at different orientations during assembly, and define insertion axes that are generally parallel to a main PCB of the receptacle assembly.

These and other objects, advantages, purposes and features of the present invention will become apparent upon review of the following specification in conjunction with the drawings.

BRIEF DESCRIPTION OF THE DRAWINGS

FIGS. 6A and 6B are front perspective views depicting the attachment of three electrical contacts to a receptacle board, in accordance with the present invention;

FIGS. 6C and 6D are additional front perspective views of the electrical contacts and receptacle board of FIGS. 6A and 6B, depicting the attachment of three power supply conductors to the electrical terminals;

DESCRIPTION OF THE PREFERRED EMBODIMENTS

Figure 1A:
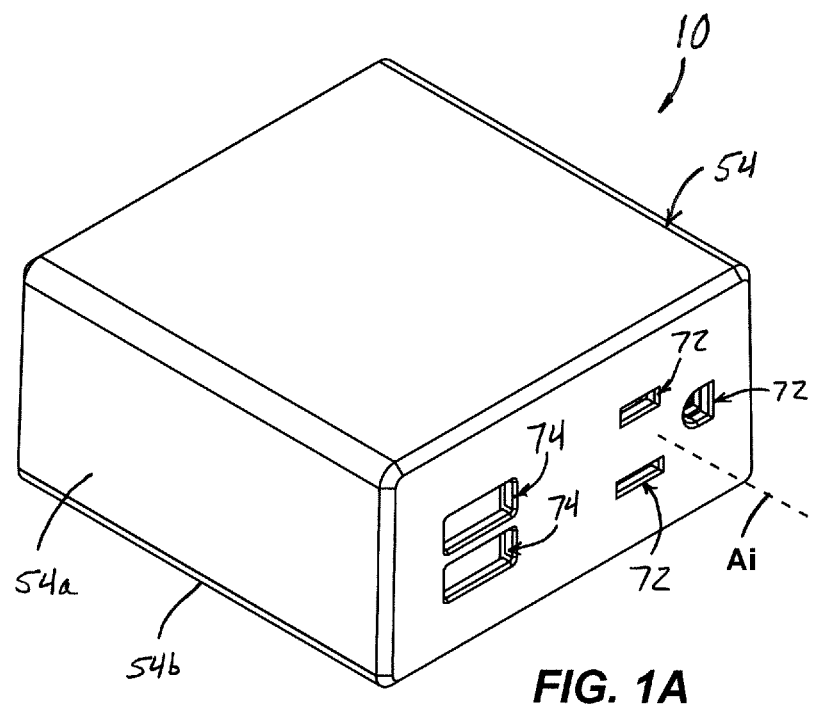
FIG. 1A is a front perspective view of an electrical power unit including a PCB-mounted high voltage electrical outlet in accordance with the present invention.

Referring now to the drawings and the illustrative embodiments depicted therein, an electrical power unit 10 includes one or more high voltage AC receptacles 12a-c mounted to a main printed circuit board (PCB) 14, and is designed to be robust, compact, and efficiently assembled. The provision of high voltage AC receptacles along a PCB presents unique challenges because PCB's are not typically built for mechanical strength or high power capacity, and high voltage AC receptacles typically require significantly higher plug insertion and plug removal forces compared to low voltage DC receptacles that are more commonly found on PCBs. It should be appreciated that the term "PCB" will be used throughout this specification and the appended claims to refer to any rigid or semi-rigid board made of insulative material such as silicon, regardless of whether or not there are any electrically conductive circuit materials or components embedded in the material or otherwise mounted to the board. The electrical power units described herein include special design features that accommodate the higher mechanical loads and higher power capacities that are required for high voltage AC receptacles, such as 110V or 220V AC "simplex" electrical receptacles having line, neutral, and ground contacts. Optionally, the electrical power units may also be fitted with low voltage DC power receptacles (such as USB receptacles) and/or electronic data receptacles, in addition to one or more high voltage AC receptacles.

Figure 2:
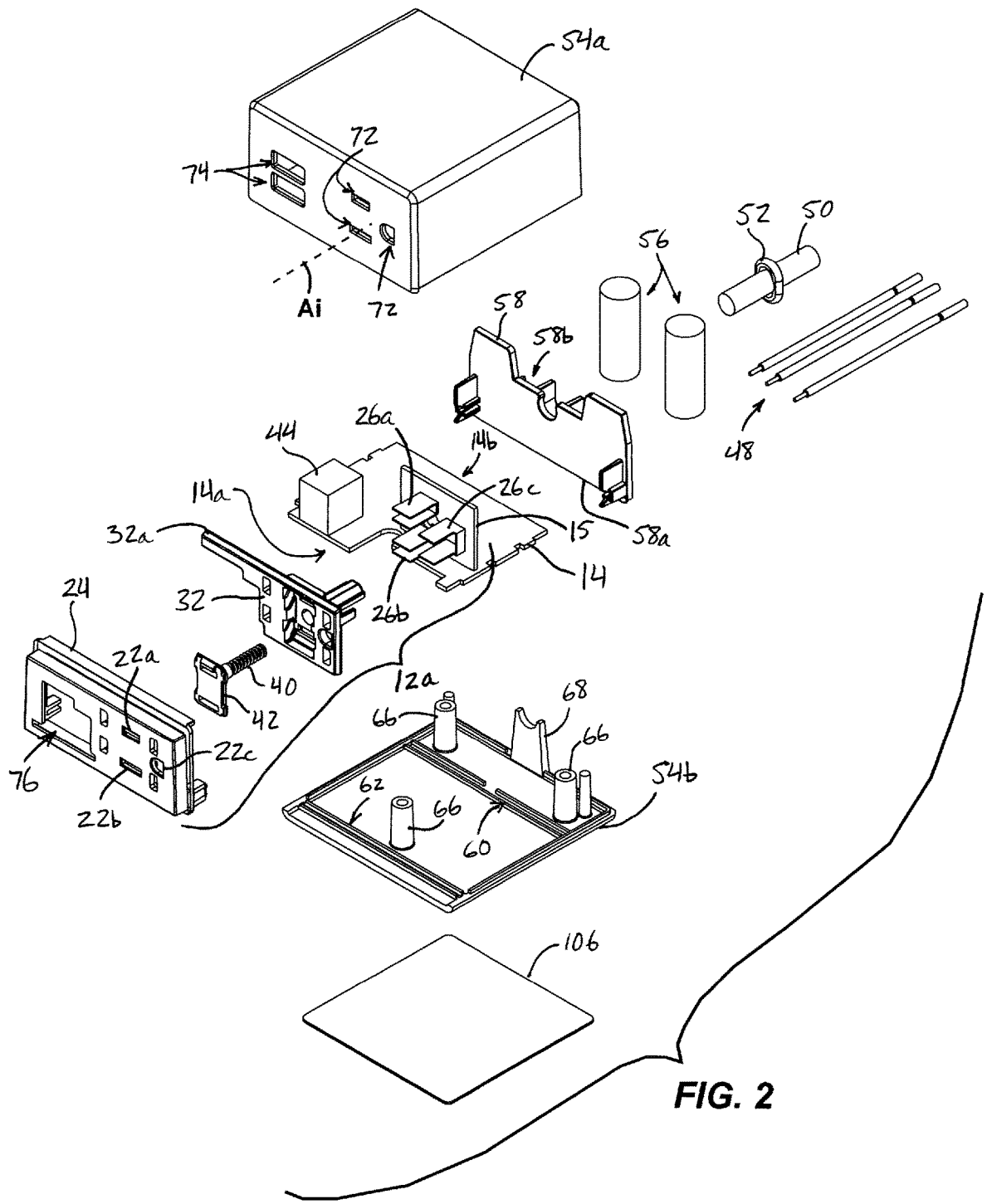
FIG. 2 is an exploded front perspective view of the electrical power unit of FIG. 1A.
Figure 5A:
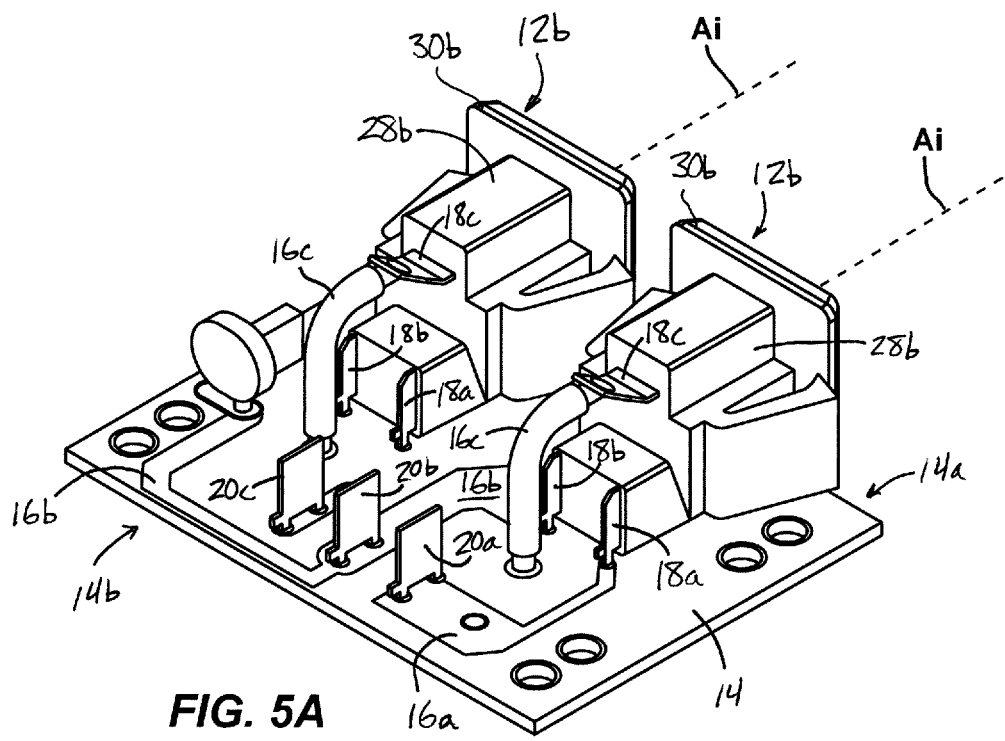
FIG. 5A is a rear perspective view of a pair of PCB-mounted high voltage electrical outlet assemblies in accordance with the present invention.
Figure 5B:
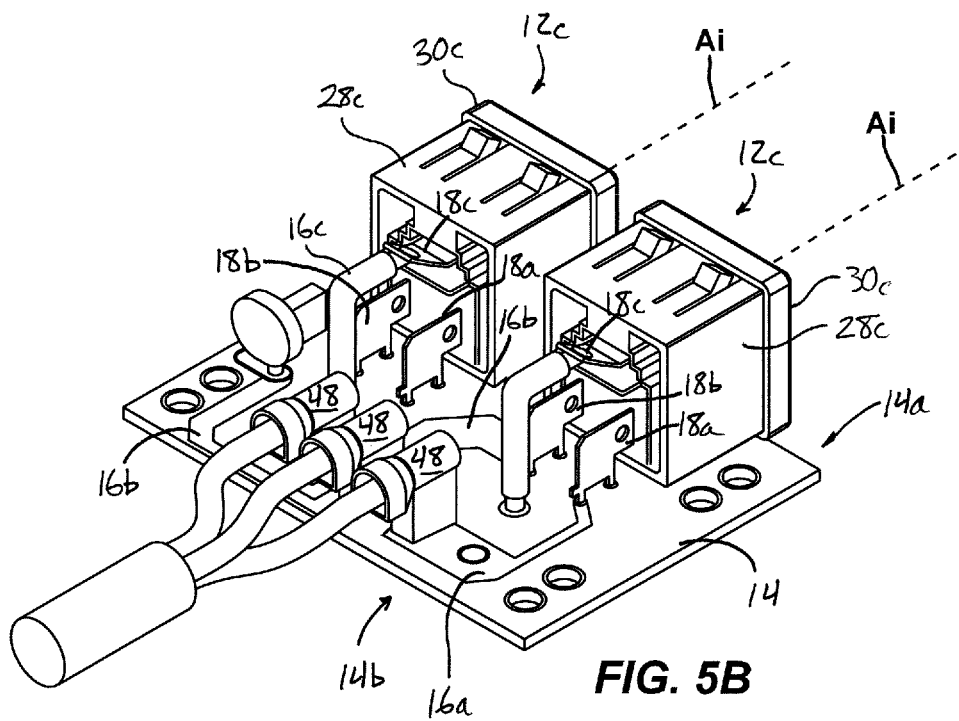
FIG. 5B is another rear perspective view of another pair of PCB-mounted high voltage electrical outlet assemblies in accordance with the present invention, shown with electrical power supply conductors attached.
Figure 7A:
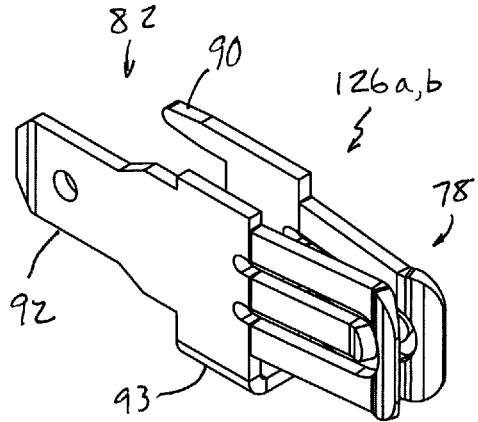
FIGS. 7A-7D are perspective views of a hot or neutral high voltage electrical contact of FIGS. 4 and 6A-6D.
Figure 7B:
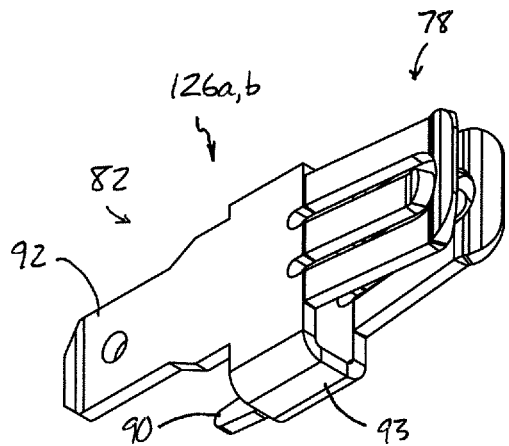
Figure 7C:
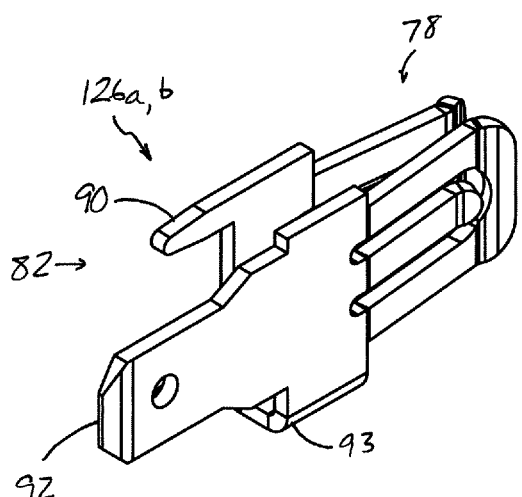
Figure 7D:
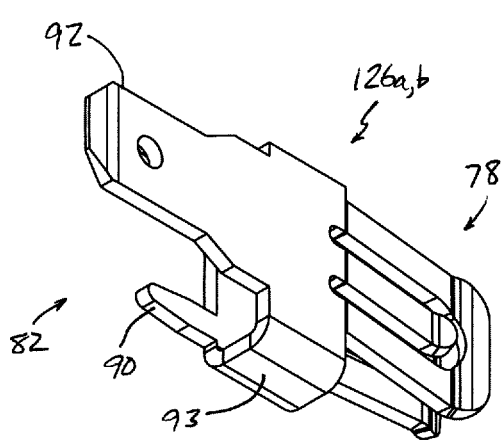
Figure 7E:
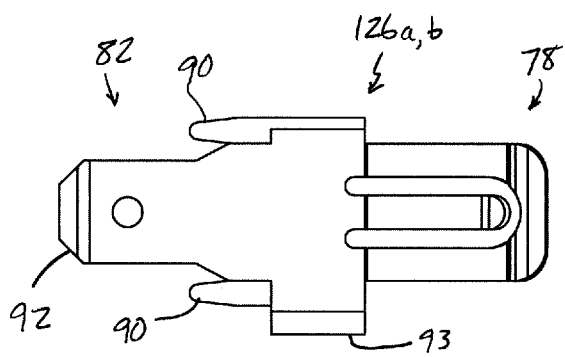
FIGS. 7E and 7F are side elevations of the hot or neutral high voltage electrical contact of FIGS. 7A-7D.
Figure 7F:
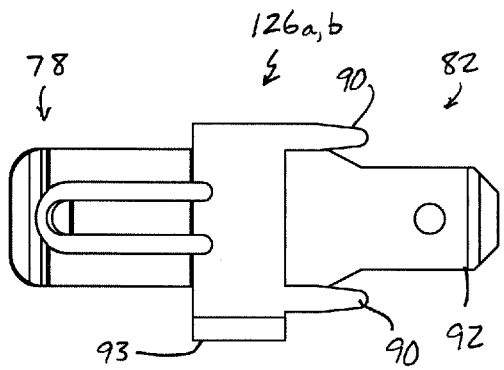
Figure 8A:
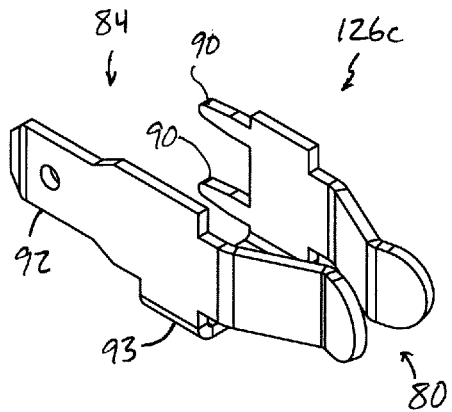
FIGS. 8A-8D are perspective views of a ground electrical contact of FIGS. 4 and 6A-6D.
Figure 8B:
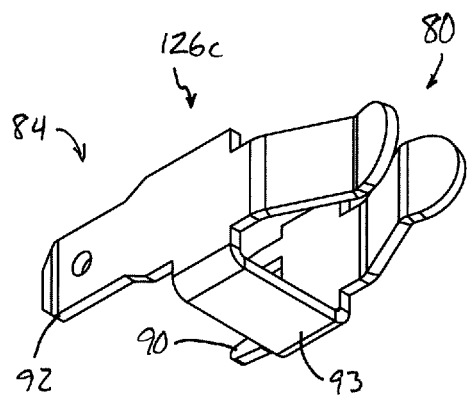
Figure 8C:
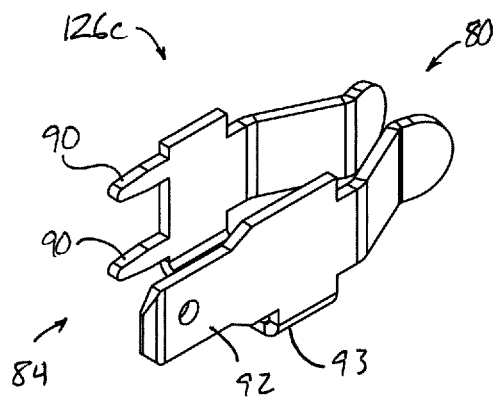
Figure 8D:
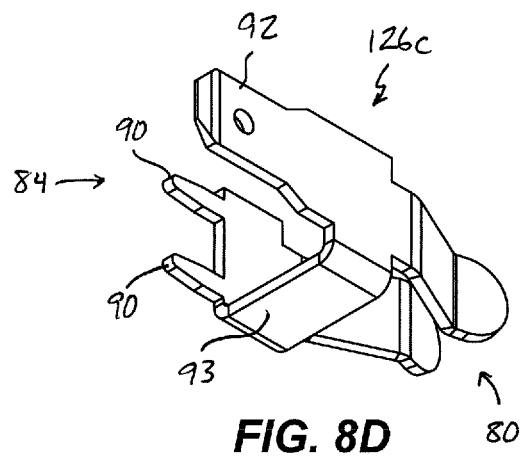
Figure 8E:
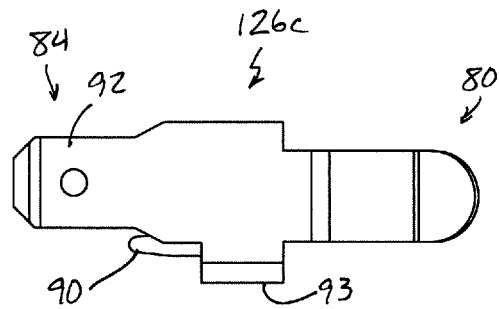
FIGS. 8E and 8F are side elevations of the ground electrical contact of FIGS. 8A-8D.
Figure 8F:
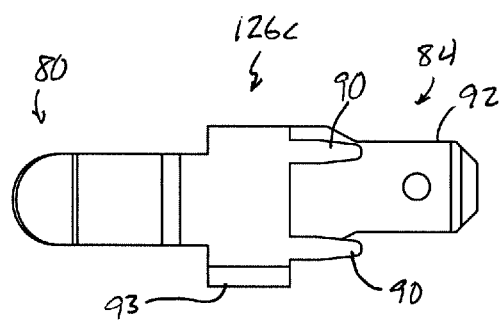

Referring to FIG. 2, the electrical power unit or receptacle assembly 10 includes one high voltage AC electrical receptacle 12a coupled to a generally planar receptacle board 15 that extends upwardly from a front end portion 14a of the main PCB 14, which is generally planar. Although the receptacle board 15 may be a printed circuit board (PCB), it may also be a non-conductive substrate that does not contain any circuitry or conductors embedded in the board material. It will be appreciated that "generally planar" is intended to mean fully planar or having at least a planar portion, or being shaped so that contact-supporting portions of the PCB lie generally along a plane even if other portions of the PCB would lie outside that plane, such as due to surface undulations or angled portions. In embodiments where more than one high voltage AC electrical receptacle 12 is provided, such as shown in FIGS. 5A and 5B, the main PCB 14 includes, for each AC receptacle 12b, 12c, a high voltage AC "line" or "hot" conductor 16a in the surface of the PCB and connecting to a corresponding rear line terminal 18a at the back of AC receptacle 12, a high voltage AC "neutral" conductor 16b in the surface of the PCB and connecting to a corresponding rear neutral terminal 18b at the back of AC receptacle 12, and a flexible wire "ground" conductor 16c extending upwardly from the surface of the PCB to a corresponding rear ground terminal 18c at the back of AC receptacle 12. As shown in FIG. 5A, each conductor 16a-c has an end spaced away from the AC receptacle 12 that terminates in a respective blade-type electrical input terminal 20a-c extending upwardly or outwardly from the main PCB 14 at a rear end portion 14b thereof.

Figure 3A:
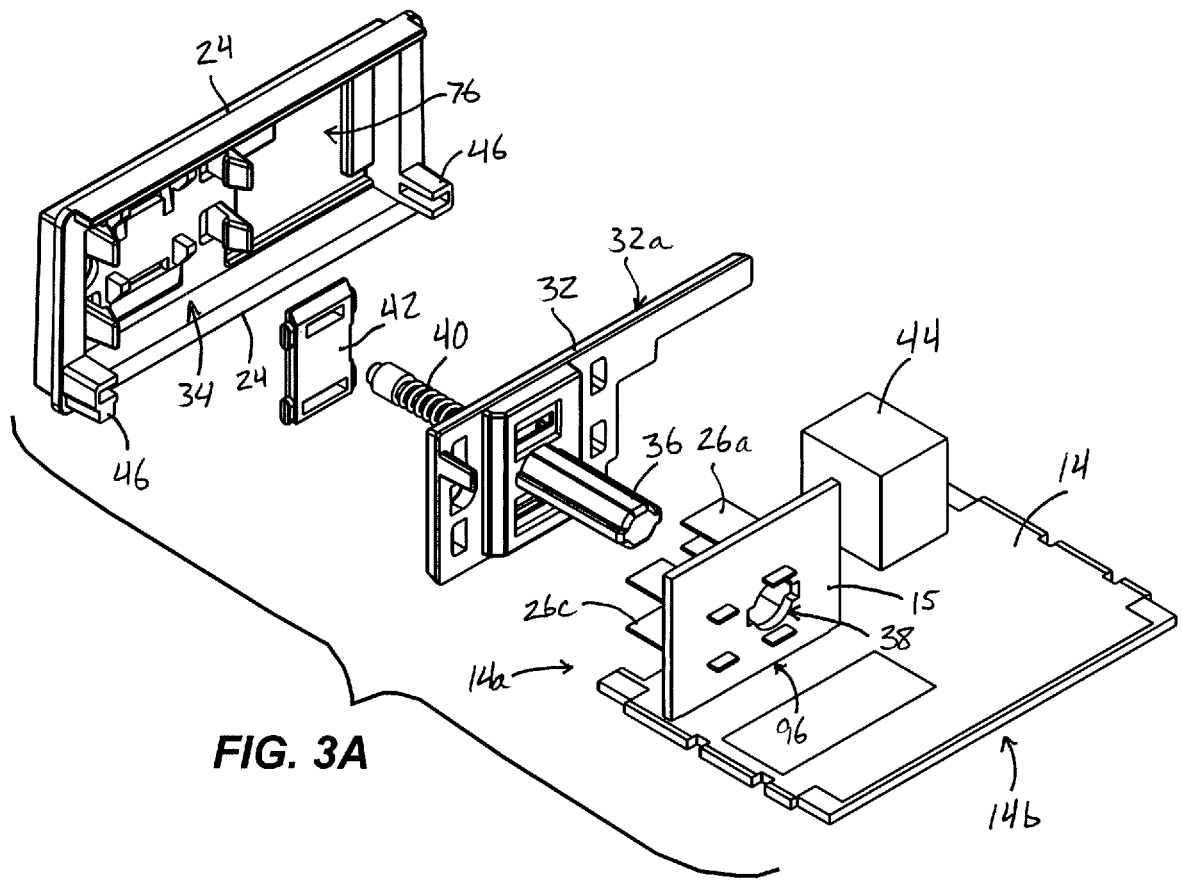
FIG. 3A is an exploded rear perspective view of the PCB, high voltage electrical outlet structure, and face plate of the electrical power unit of FIG. 1A.
Figure 3B:
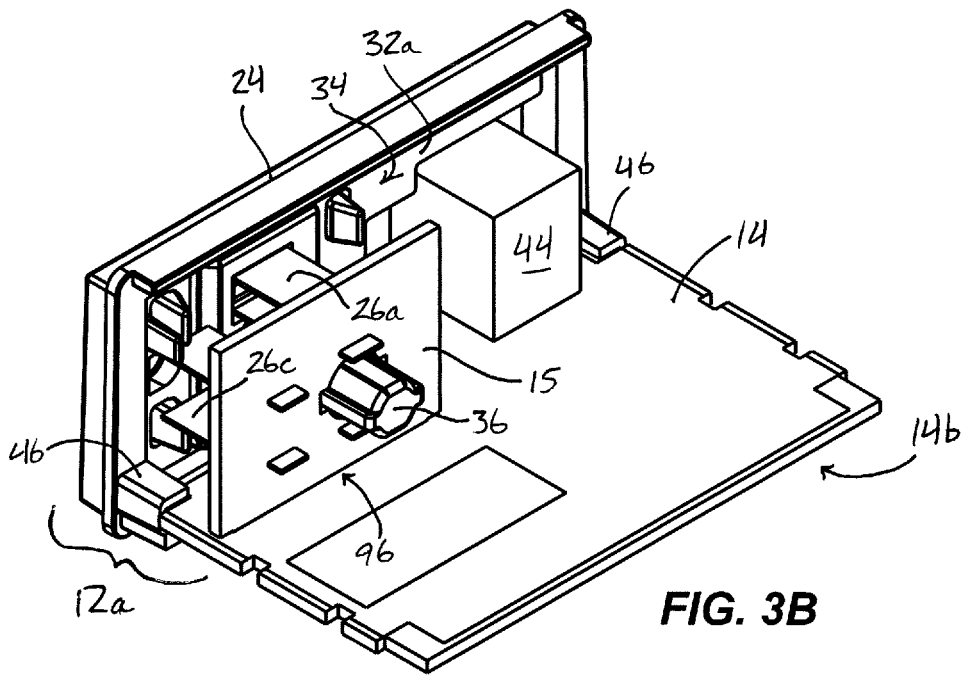
FIG. 3B is a rear perspective view of the PCB, high voltage electrical outlet structure, and face plate of FIG. 3A, shown in an assembled configuration.

Referring to FIGS. 1A, 2, 5A and 5B, each AC receptacle 12a-c defines an insertion axis Ai that corresponds to the general alignment and insertion/removal direction of a male-prong electrical plug (not shown) that is compatible for engagement with the respective AC receptacle 12a-c. Therefore, the insertion axis Ai is defined by outlet openings 22a-c formed in an interior face portion 24 of each AC receptacle 12a (FIG. 2), and by the AC receptacle's electrical contacts 26a-c that are recessed behind the outlet openings 22a-c and the interior face portion 24. As can be seen in FIGS. 5A and 5B, the insertion axis Ai defined by the respective receptacles 12b, 12c is substantially parallel to the generally planar main PCB 14. This means that the mechanical loads of inserting and removing an electrical plug, relative to the AC receptacles 12b, 12c, can result in significant shear loads and bending moments between the AC receptacles 12b, 12c and the main PCB 14 to which a given receptacle is mounted, because the loads are generally parallel to (and spaced outwardly from) the main PCB 14. A similar principle applies to the receptacles 12*a* of FIGS. 2-4 and 6A-6D, in which electrical contacts 26*a-c*, 126*a-c* are individually mounted to the receptacle board 15 as will be described in more detail below, and the receptacle board 15 is coupled to the main PCB 14. To resist the forces of insertion and removal of the male prongs of a power plug into and out of the contacts 126*a-c*, the receptacle board 15 includes a narrowed lower region 15*a* that is received into a corresponding slot 96 that is formed in the main PCB 14 (FIGS. 3A and 3B). This facilitates a strong connection between the receptacle board 15 and the main PCB 14, such as via a solder joint, adhesive joint, or other mechanical fasteners.

In the embodiments of FIGS. 5A and 5B, the rear hot terminal 18*a* and rear neutral terminal 18*b* are secured to the main PCB in a manner that resists the loads imparted to the AC receptacles 12*b*, 12*c* during plug insertion and removal. Optionally, each receptacle 12*b*, 12*c* has a respective contact housing 28*b*, 28*c* that can be secured directly to the main PCB 14, and a front face 30*b*, 30*c* having a larger perimeter dimension than its contact housing 28*b*, 28*c*. This allows an outer housing panel of the electrical receptacle assembly (not shown), which has an opening sized and shaped to receive each contact housing 28*b*, 28*c*, to support the receptacles 28*b*, 28*c* against loads of plug insertion. In this arrangement, each front face 30*b*, 30*c* would be backed by a portion of the outer housing panel that frames or defines an opening surrounding at least a portion of each receptacle 12*b*, 12*c*. The front of the outer housing panel, where the outlet front faces 30*b*, 30*c* are located, also provides support for the AC receptacles 12*b*, 12*c* in directions that are orthogonal to the insertion axis Ai, such as due to side loads or vertical loads applied to a male-prong plug that is already inserted into the AC receptacle 12*b*, 12*c*.

Figure 4:
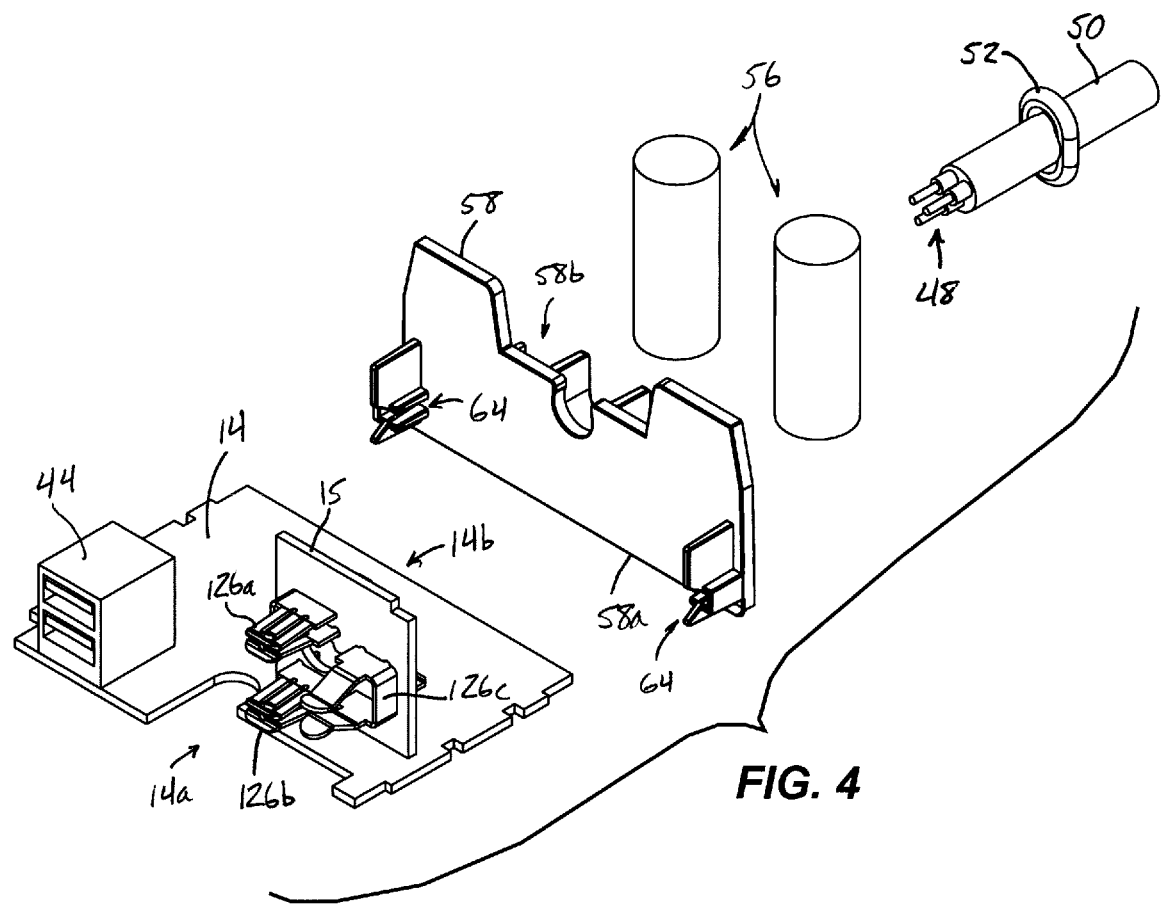
FIG. 4 is an exploded front perspective view of the PCB fitted with an alternative high voltage electrical outlet structure, and the face plate of the electrical power unit.

Referring now to the embodiments of FIGS. 2-4, it will be appreciated that the AC receptacle 12*a* is not a self-contained assembly as in the AC receptacles 12*b*, 12*c* described above with reference to FIGS. 5A and 5B, but instead is assembled during assembly of the overall electrical receptacle assembly 10. Referring to FIGS. 2-3B, an intermediate support 32 is disposed between the receptacle board 15 and its contacts 26*a-c*, and the interior face portion 24. The intermediate support 32 is received in a rear cavity 34 of the interior face portion 24 (FIG. 3B), and includes an upper region 32*a* that extend substantially the width of the main PCB 14 and the rear cavity 34 of the interior face portion 24. The intermediate support 32 further includes a hollow rearward post 36 that extends through an opening 38 formed in the receptacle board 15, as shown in FIG. 3B, to ensure proper alignment, and to contain a coil spring 40 associated with a slider 42 that interacts with interior surfaces of the interior face portion 24 and the intermediate support 32 to provide a tamper-resistant safety function, which is more fully described in commonly-owned U.S. Pat. No. 9,059, 530, which is hereby incorporated herein by reference in its entirety. In the illustrated embodiment, a low voltage DC electrical receptacle 44 (illustrated as a dual-outlet USB power receptacle) is mounted to the main PCB 14 in a generally side-by-side arrangement with the AC receptacle 12*a*, with a portion of the intermediate support's upper region 32*a* overlying and stabilizing the low voltage receptacle 44. The interior face portion 24 includes a pair of rearward-projecting channel members 46 that receive respective side edge regions of the main PCB's front end portion 14*a*, as shown in FIG. 3B.

Figure 1B:
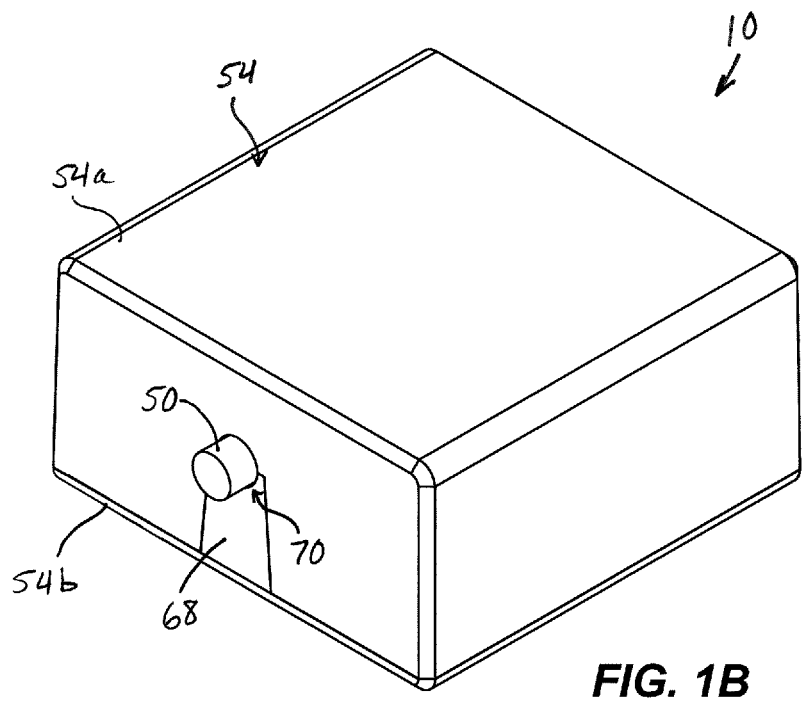
FIG. 1B is a rear perspective view of the electrical power unit of FIG. 1A.

The electrical receptacle assembly 10 is fitted with high voltage power cord 50 containing three conductors 48 in the illustrated embodiment, as shown in FIGS. 2 and 4, with a wire grommet 52 providing strain relief where the cord 48 enters a rear of a main housing 54, such as shown in FIG. 1B. Electrical power converter circuitry 56 is provided inside the main housing 54, and receives power from the high voltage power cord 50. The incoming high voltage power is converted to low voltage DC electrical power that is then supplied or directed to the low voltage DC electrical receptacle 44 through wires or through conductor traces along the main PCB 14. Optionally, provision may be made for electronic data connectors along the PCB, if desired.

Power converter circuitry 56 is positioned behind an upright insulator wall 58 that extends across the interior of the main housing 54 and supports the rear portion 14*b* of the main PCB 14. The insulator wall 58 is disposed between the power converter circuitry 56 and the receptacles 12*a* and 44, and may provide support structure for the power converter circuitry 56, such as shown in FIGS. 2 and 4. Optionally, the power converter circuitry 56 is supported along the main PCB or along a rear upper surface of a lower housing panel 54*b*. A lower edge 58*a* of the insulator wall 58 is received in an intermediate lateral slot 60 formed in an upper surface of a lower housing panel 54*b* (FIG. 2), while an upper region 58*b* of the insulator wall 58 is shaped to permit passage of electrical wiring into a forward region of the interior of the housing 54, if desired, such as for electrically connecting the conductors 48 to respective contacts 126*a-c*, as will be described below. A forward lateral slot 62 formed in the lower housing panel's upper surface receives a lower edge 24*a* of the interior face portion 24. A pair of forward-projecting channel members 64 of the upright insulator wall 58 receive respective side edge regions of the main PCB's rear end portion 14*b*, as shown in FIG. 3B. The main PCB is thus held by the interior front face 24 and the upright insulator wall 58, in a fixed position in the interior of the housing 54, which further includes an upper housing portion 54*a* that is received atop the lower housing panel 54*b* and secured with threaded fasteners through fastener bosses 66 (FIG. 2), ultrasonic welding, snap-fit fasteners, cold-swaged connections, or other suitable fastening method. An upright rear projection 68 fits into and cooperates with the rear of the main housing 54 to define an opening 70 through which the electrical cord 50 passes into the housing 54 (FIG. 1B). Power cord 50 may terminate at its other end with a conventional male plug for connection to a wall outlet, a floor outlet, or the like, or may be hard-wired to an electrical power source.

As shown in FIGS. 1A and 2, a front panel of the main housing 54 includes or defines a plurality of AC receptacle openings 72 that permit insertion of male prongs (not shown) into the respective outlet openings 22*a-c* of the interior front face 24. Similarly, the main housing's front panel defines low voltage DC receptacle openings 74 that permit insertion of a compatible DC power plug, such as a USB plug (not shown). A plug inserted through the DC receptacle openings 74 will pass through a DC outlet opening 76 formed in the interior front face 24 (FIGS. 2 and 3A), and into the low voltage DC electrical receptacle 44 that is mounted on the main PCB 14. The DC receptacle openings 74 in the front panel of the main housing 54 are smaller than the corresponding receptacles 44 so that the main housing's front panel provides additional support for the DC receptacle 44 when a corresponding male plug is inserted in the DC receptacle 44. At least some of the plug extraction loads may thus be borne by the main housing's front panel and/or the interior front face 24 and the rest of the housing 54, rather than being fully imparted as shear loads and bending moments between the receptacles 44, 12a and the main PCB 14.

Electrical contacts 26a-c, 126a-c are individually mounted to the receptacle board 15, which in turn is supported on the main PCB 14. It will be understood that the electrical contacts 26a-c of FIGS. 2-3B are simplified renderings that represent substantially any style of electrical power contact, including the contacts 126a-c described herein, such that. Referring to FIGS. 6A-6B, a hot contact 126a and neutral contact 126b are identical to one another, but the neutral contact 126b is rotated 180 degrees compared to the hot contact 126a during assembly. The general configuration of blade or spade receiving contact portions 78 of the hot and neutral contacts 126a, 126b are more fully described in commonly owned U.S. Pat. No. 4,990,110, the disclosure of which is hereby incorporated herein by reference. The ground contact 126c has a somewhat different configuration of contact 80 to accommodate a typical cylindrical ground prong of a male power plug. The hot and neutral contacts 126a, 126b have a mounting portion 82 opposite the contact portions 78, and the ground contact 126b has a similar mounting portion 84 for securing the contacts to the receptacle board 15 and establishing electrical continuity with the conductors 48, as will be described below. To accommodate the contacts 126a-c, receptacle board 15 defines a blade slot 86 on either side of the post opening 38 for the hot and neutral contacts 126a, 126b, and another blade slot 86 below the post opening 38 for the ground contact 126c. In addition, the receptacle board 15 defines a pair of pin-receiving openings 88 corresponding to (and laterally offset from) each blade slot 86.

Each contact 126a-c includes, at its respective mounting portion 82, 84, a pair of vertically-spaced rearward-projecting pins 90 and a rearward-projecting male blade or spade 92 that is spaced laterally from the pins 90, as best shown in FIGS. 7A-8F. The side of each contact 126a-c having the pins 90 is coupled to the other side of each contact having the male blade 92 by a generally U-shaped bight region 93. In the illustrated embodiment, the bight region 93 of the ground contact 126c is wider than the corresponding bight region of the hot and neutral contacts 126a, 126b, on account of the wider-spaced ground contact portion 80 for the male ground prong of an AC power plug. Referring to FIGS. 6A and 6B, each pin 90 extends through a respective pin-receiving opening 88 and each blade 92 extends through a respective blade slot 86 in the receptacle board 15. Each pin 90 is secured to the receptacle board 15 at its respective opening 88 via soldering or other suitable fastening connection. The pins 90 and blades 92 provide rigidity to the mounting portion 82, 84 of each contact 126a-c, so that deflections of each contact 126a-c are limited to the flexible contact portions 78, 80 during plug insertion. In addition, the use of pins 90 can improve the manufacturability of each receptacle 12a by facilitating the use of automated selective soldering equipment, in which only the junctions of the pins 90 to their respective pin-receiving openings 88 receive solder.

While it is envisioned that each blade 92 may also be secured to the receptacle board 15 at its respective blade slot 86 via a solder joint or other suitable method, such connection is not necessarily required, as the dimensions of each blade slot 86 may be closely matched to the dimensions of each blade 92, so that the blades 92 will provide lateral and vertical support for each contact 126a-c and will resist bending moments in its slot 86, so that deflections of each contact 126a-c are limited to the flexible contact portions 78, 80 during plug insertion. The solder connections of the pins 90 to the receptacle board 15 at openings 88 may be expected to provide sufficient security (resistance to separation from the receptacle board 15) for each contact 126a-c. Referring to FIGS. 6C and 6D, each blade 92 projects through the back of the receptacle board 15, where it is engaged by a respective female blade terminal 94 that establishes electrical continuity for each contact 126a-c to a respective one of the conductors 48 of the power cord 50. It is envisioned that a wider receptacle board may accommodate two or more sets of electrical contacts to provide power to two or more male plugs, in which case each set of contacts 126a-c may receive its own wire connection via respective female blade terminals 94, or a single set of contacts 126a-c may receive power from female blade terminals 94 to wires 48, with additional sets of contacts receiving power via conductive traces established along the receptacle board (which, in that case, may be a printed circuit board or PCB), similar to the conductor traces 16a, 16b in the embodiment of FIGS. 5A and 5B. Thus, it is envisioned that electrical connections between each AC receptacle 12a-c and the power supply wiring 48 can be made without butt splice connections, to further increase robustness of the electrical connections.

It is envisioned that the receptacle board 15 may be formed with different arrangements of slots and holes to receive corresponding contacts 126a-c in different orientations and positions, which permits the resulting receptacles 12a to be oriented at any desired rotational orientation about the insertion axis Ai (or about an axis substantially parallel to the insertion axis Ai), such as shown with the contacts 26a-c of FIGS. 2-3B. Similarly, the pre-assembled receptacles 12b, 12c may be set at different rotational orientations with minor changes to the placement of the rear line terminals 18a, 18b. Thus, in the case of the 110V AC simplex receptacles 12a-c described herein, the AC receptacles may be rotated to any of four different orientations about the insertion axis Ai during assembly to the main PCB 14. In the case of the receptacle 12a having contacts 126a-c mounted to the receptacle board 15, it is envisioned that the receptacle board could be modified to facilitate mounting to the main PCB at any desired orientation rotated about the insertion axis Ai.

Figure 9A:
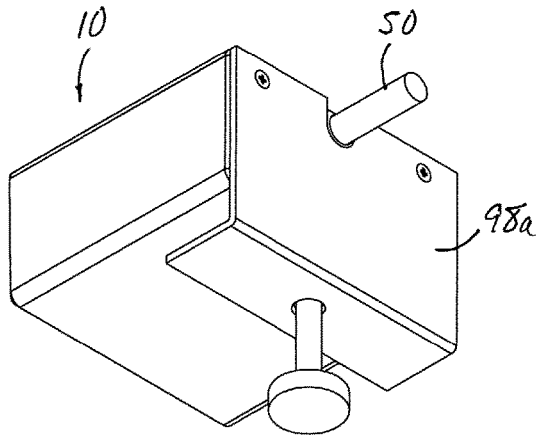
FIGS. 9A-9F are bottom-rear perspective views of the electrical power unit of FIG. 1A shown fitted with different mounts.
Figure 9B:
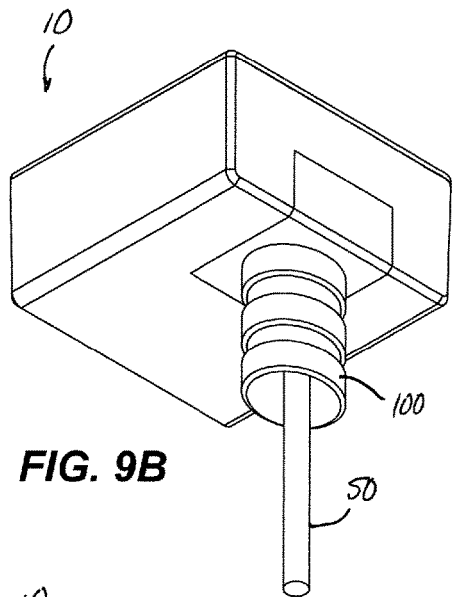
Figure 9C:
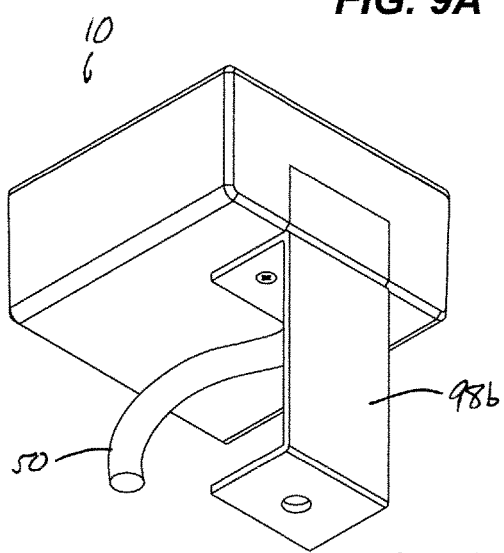
Figure 9D:
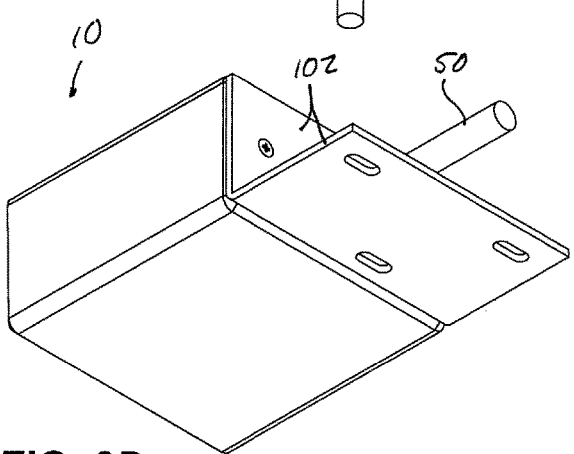
Figure 9E:
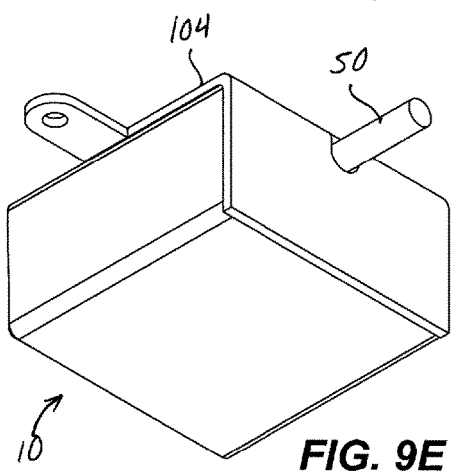
Figure 9F:
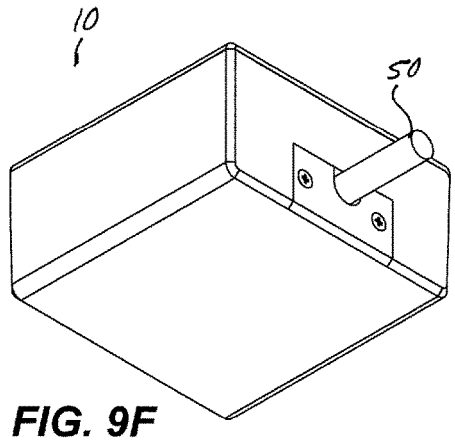

Various mounting options for electrical power unit 10 are envisioned, such as a low profile edge-mount clamp 98a (FIG. 9A), a taller profile edge-mount clamp 98b (FIG. 9C), a post mount including a flexible or rigid boot 100 (FIG. 9B), an L-bracket 102 for top surface mounting (FIG. 9D), an L-bracket 104 for below surface mounting (FIG. 9E), or a non-secured or free positioning arrangement (FIGS. 1A-2 and 9F) in which an anti-skid pad 106 (FIG. 2) may be used for resting the electrical power unit in a manner that allows it to be freely moved around atop a desk, table, countertop, shelf, or other surface as desired by a user.

Therefore, the electrical power unit provides convenient access to high voltage AC electrical power, and optionally to low voltage DC power, in a compact package that is robust and durable, which is easy to assemble with few (if any) separate mechanical fasteners, and which utilizes conductors on a PCB to carry high voltage AC power to PCB-mounted high voltage AC receptacles, which can be mounted at different orientations if desired.

Changes and modifications in the specifically-described embodiments may be carried out without departing from the principles of the present invention, which is intended to be The embodiments of the invention in which an exclusive property or privilege is claimed are defined as follows:

1. An electrical receptacle assembly comprising:
a printed circuit board (PCB) comprising a generally planar portion;
at least two electrical conductors disposed along said generally planar portion of said PCB and each configured to conduct high voltage AC electrical current;
at least two electrical input terminals extending outwardly from said PCB and configured to be engaged by respective terminals of an electrical power source, wherein said at least two electrical input terminals are in electrical communication with said electrical conductors; and
a high voltage AC electrical receptacle coupled to said generally planar portion of said PCB, said electrical receptacle comprising at least two outlet openings and at least two electrical contacts positioned behind each of said outlet openings, wherein said outlet openings and said electrical contacts cooperate to define an insertion axis;
wherein said electrical contacts are in electrical communication with respective ones of said electrical conductors;
wherein said insertion axis is substantially parallel to said planar portion of said PCB; and
wherein said at least two electrical conductors comprise high voltage electrical conductor traces disposed along said PCB and providing electrical continuity from said at least two electrical input terminals to respective ones of said at least two electrical contacts of said electrical receptacle.

2. The electrical receptacle assembly of claim 1, wherein no butt splice connections are present between said electrical input terminals and said electrical contacts.

3. The electrical receptacle assembly of claim 1, further comprising an electrical power input cord comprising at least two power input conductors fitted with respective power output terminals configured to engage respective ones of said at least two electrical input terminals.

4. The electrical receptacle assembly of claim 3, wherein said power output terminals comprise right-angle terminals, wherein said power input conductors extend away from said PCB in a direction that is substantially perpendicular to said electrical input terminals upon engagement of said power output terminals with said electrical input terminals.

5. The electrical receptacle assembly of claim 1, further comprising a second high voltage AC electrical receptacle coupled to said generally planar portion of said PCB, and at least two high voltage electrical conductor traces disposed along said PCB and providing electrical continuity from said at least two electrical input terminals of said high voltage AC electrical receptacle to respective electrical input terminals of said second high voltage AC electrical receptacle.

6. The electrical receptacle assembly of claim 1, further comprising a low voltage DC electrical receptacle coupled to said generally planar portion of said PCB adjacent said high voltage AC electrical receptacle.

7. The electrical receptacle of claim 6, further comprising an electrical converter configured to convert incoming high voltage AC electrical power from said power supply conductors to low voltage DC electrical power, wherein said low voltage DC electrical power is directed along said main PCB to said low voltage DC electrical receptacle.

8. An electrical receptacle assembly comprising:
a housing defining an interior cavity and at least two receptacle openings providing access to said interior cavity;
a main printed circuit board (PCB) disposed in said interior cavity;
a receptacle board coupled to said main PCB and extending outwardly away from said main PCB in said interior cavity, said receptacle board defining a plurality of contact openings in spaced arrangement;
at least two high voltage AC electrical power contacts coupled directly to said receptacle board at respective ones of said contact openings, wherein said electrical power contacts are positioned behind respective ones of said receptacle openings in said housing and configured to receive respective prongs of a male power plug inserted through said receptacle openings;
at least two high voltage AC electrical power supply conductors extending through said housing and into said interior cavity, wherein said electrical power supply conductors are electrically coupled to respective ones of said electrical power contacts; and
at least two high voltage AC electrical input contacts in electrical communication with said electrical power contacts and said power supply conductors;
wherein said electrical power contacts each comprise a rearward-projecting pin for engagement with a respective one of said contact openings; and
wherein said receptacle board defines a plurality of slots spaced apart from said openings, and said electrical power contacts each comprise a rearward-projecting male spade for engagement with a respective one of said slots, wherein said rearward-projecting male spades project rearwardly from a rear surface of said receptacle board.

9. The electrical receptacle assembly of claim 8, further comprising a solder joint coupling each of said rearward-projecting pins to said receptacle board at said contact openings.

10. The electrical receptacle assembly of claim 8, wherein said electrical power contacts each comprise a rearward-projecting pin for engagement with a respective one of said contact openings, wherein said rearward-projecting pin is spaced from a corresponding one of said male spades, and said electrical receptacle assembly further comprising a solder joint coupling each of said rearward-projecting pins to said receptacle board at said contact openings.

11. The electrical receptacle assembly of claim 8, further comprising a female blade terminal electrically coupled to each of said male spades, wherein said female blade terminals are electrically coupled to said power supply conductors.

12. The electrical receptacle assembly of claim 8, wherein said receptacle openings and said electrical power contacts cooperate to define an insertion axis that is substantially parallel to said main PCB.

13. The electrical receptacle assembly of claim 8, further comprising a low voltage DC electrical receptacle coupled to said main PCB adjacent said receptacle board, wherein said housing defines a DC receptacle opening providing access to said low voltage DC electrical receptacle in said interior cavity.

14. The electrical receptacle of claim 13, further comprising an electrical converter coupled to said housing and configured to convert incoming high voltage AC electrical power from said power supply conductors to low voltage DC electrical power, wherein said low voltage DC electrical power is directed along said main PCB to said low voltage DC electrical receptacle.

15. An electrical receptacle assembly comprising:
- a generally planar insulative receptacle board defining a plurality of slots in spaced arrangement and a plurality of openings in spaced arrangement with respective ones of said slots;
- at least two high voltage AC electrical power contacts each having a rear mounting portion and a flexible forward contact portion, wherein said rear mounting portion is coupled directly to said receptacle board at respective sets of said slots and openings;
- said rear mounting portions each comprising:
  - a rearward-projecting pin that is received in a respective one of said openings and secured to said receptacle board; and
  - a rearward-projecting power-receiving terminal spaced from said rearward-projecting pin;
  - wherein said power-receiving terminal is received through a respective one of said slots and projects rearwardly from said receptacle board for electrical coupling to a power supply conductor; and
- said flexible forward contact portion extending forwardly from said receptacle board and configured to receive a prong of a male power plug.

16. The electrical receptacle assembly of claim 15, wherein each of said high voltage AC electrical power contacts comprises a pair of said rearward-projecting pins received in respective ones of said openings in said receptacle board, and wherein said rearward-projecting pins are soldered to said receptacle board.

\* \* \* \* \*